(12) United States Patent
Matsushita et al.

(10) Patent No.: US 6,459,568 B2
(45) Date of Patent: Oct. 1, 2002

(54) HYBRID TYPE GAS INSULATION SWITCH GEAR APPARATUS

(75) Inventors: Kozo Matsushita, Chigasaki; Shinsuke Uchino, Yokohama; Masaru Nozawa, Kawasaki; Akihiro Yoshimi, Kawasaki; Atsushi Abumiya, Kawasaki; Kazutoshi Ogata, Munakata; Yoshinori Nagafuchi; Toshiyuki Sugawara, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/916,577

(22) Filed: Jul. 30, 2001

(30) Foreign Application Priority Data

Jul. 31, 2000 (JP) ........................................ 2000-231861

(51) Int. Cl.7 ............................................... H02B 1/04
(52) U.S. Cl. ........................................ 361/604; 218/67
(58) Field of Search .................. 200/148 R; 218/43–45, 218/55, 67, 75, 78–80; 307/112, 113, 147, 148; 174/68.2, 70 B, 72 B, 88 B; 361/602–604, 605, 611, 612, 618–621

(56) References Cited

U.S. PATENT DOCUMENTS

| | | | | |
|---|---|---|---|---|
| 4,109,124 A | * | 8/1978 | Boersma et al. | 218/77 |
| 4,651,255 A | * | 3/1987 | Suzuyama et al. | 361/612 |
| 5,175,667 A | * | 12/1992 | Kondo | 361/604 |
| 5,777,842 A | * | 7/1998 | Tsukushi et al. | 361/603 |

* cited by examiner

Primary Examiner—Gerald Tolin
(74) Attorney, Agent, or Firm—Oblon, Spivak, McClelland, Maier & Neustadt, P.C.

(57) ABSTRACT

In a hybrid type gas insulation switch gear apparatus, an enclosure includes a cylindrical branched portion branched from a cylindrical body so as to be inclined obliquely upward. An insulating gas is sealed therein. Insulating enclosures are mounted to the enclosure and the cylindrical branched portion, a disconnecting switch is arranged within the enclosure and electrically connected to the bushing. A circuit breaker is arranged within the insulating enclosure and electrically connected in series to the disconnecting switch. A current transformer is arranged on the cylindrical branched portion. A connecting conductor is arranged in between the circuit breaker and the disconnecting switch and an earth switch mounted to the enclosure, and an insulating member for supporting a primary electrode and the bushing conductor on the enclosure.

27 Claims, 15 Drawing Sheets

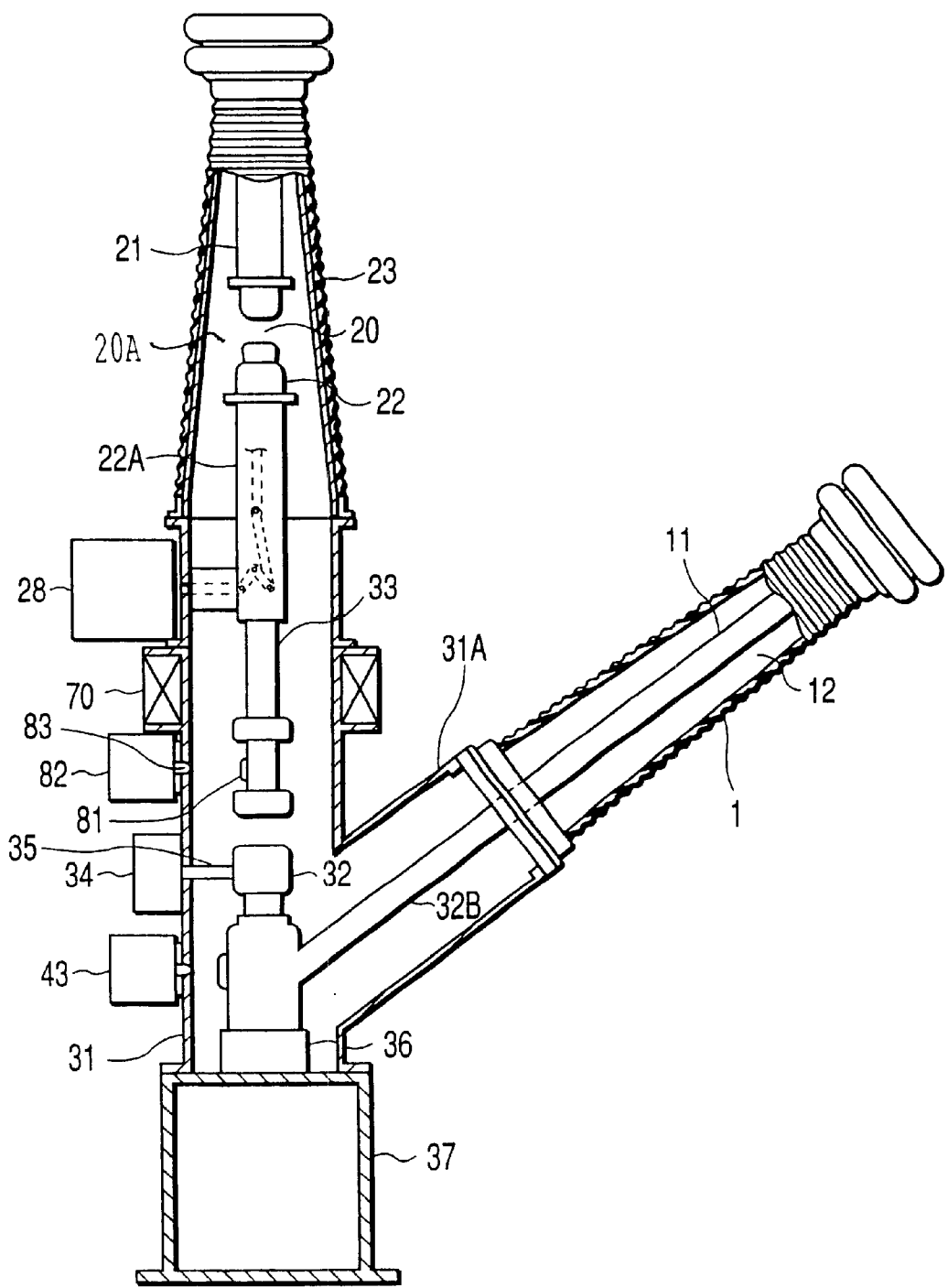
F I G. 16

HYBRID TYPE GAS INSULATION SWITCH GEAR APPARATUS

CROSS-REFERENCE TO RELATED APPLICATIONS

This application is based upon and claims the benefit of priority from the prior Japanese Patent Application No. 2000-231861, filed Jul. 31, 2000, the entire contents of which are incorporated herein by reference.

BACKGROUND OF THE INVENTION

1. Field of the Invention

The present invention relates to a hybrid type gas insulation switch gear apparatus installed in an electrical building such as a substation and, particularly to a hybrid type gas insulation switch gear apparatus having an improved arrangement of various equipments such as the circuit breaker.

2. Description of the Related Art

In general, the bus and the iron tower in an air substation have a long life and, thus, are less likely to be renewed in replacing the switch gear apparatus. Therefore, a gear switch apparatus of a high performance and a high reliability is substituted in many cases while effectively utilizing the existing air insulating bus, etc. In order to cope with such a requirement, proposed to date as an equipment for power supply is a hybrid type gas insulation switch gear apparatus prepared by combining a plurality of switch gears for power supply such as a circuit breaker, and a disconnector or a disconnecting switch.

FIGS. 1 and 2 collectively show a general hybrid type gas insulation switch gear apparatus as an example of the hybrid switch gear apparatus, wherein FIG. 1 is a circuit diagram of a general hybrid type gas insulation switch gear apparatus, and FIG. 2 shows the construction of the hybrid type gas insulation switch gear apparatus connecting to the circuit diagram shown in FIG. 1.

The hybrid type gas insulation switch gear apparatus shown in FIG. 2 comprises bushings 1-1, 1-2, a circuit breaker 2, a disconnecting switch 3, an earth switch 4, and a current transformer 5.

The circuit breaker 2 includes an enclosure 2C, which is arranged within an electric power station via supporting members 7 such that the axis of the enclosure 2C is parallel to the installing plane within the electric power station. The circuit breaker 2 also includes a fixed electrode 2A and a movable electrode 2B capable of contact with the fixed electrode 2A which are arranged within the enclosure 2C. The fixed electrode 2A and movable electrode 2B are arranged on the same axis. An operating mechanism 8 for operating the movable electrode 2B is mounted to one open end portion of the enclosure 2C, and a bushing 1 having a conductor 1A-1 connected to the movable electrode 2B is vertically mounted to a cylindrical connecting portion projecting upward from the circumferential surface of the enclosure 2C.

Also, the disconnecting switch 3 includes a cylindrical enclosure 3C, which is mounted within the electric power station via the supporting member 7 such that the axis of the enclosure 3C is perpendicular to the installing plane of the electric power station. The disconnecting switch 3 also includes a fixed electrode 3A and a movable electrode 3B capable of being moved to contact the fixed electrode 3A, which are arranged within the enclosure 3C. The fixed electrode 3A and the movable electrode 3B are arranged on the same axis. A disconnecting switch operating mechanism 9 for operating the earth switch 4 and the movable electrode 3B is mounted to the circumferential surface of the enclosure 3C. A cylindrical connecting portion projecting upward from the circumferential surface of the enclosure 3C of the disconnecting switch 3 is connected to the other open end portion of the enclosure 2C via a connecting cylinder 10 having a diameter smaller than that of said other end portion. Further, a bushing 1-2 including a conductor 1A-2 connected to the fixed electrode 3A is vertically mounted to the open end portion positioned above the enclosure 3C.

Further, the current transformer 6 is mounted to the outer circumferential surface of the cylindrical connecting portion of the enclosure 2C, which is mounted to the mounting flange portion of the bushing 1-1 in a manner to surround the conductor 1A-1. Also, the current transformer 5 is mounted to the outer circumferential surface of the connecting cylinder 10 in a manner to surround a current conductor.

Incidentally, a sealing gas such as a $SF_6$ gas is sealed in the enclosure 2C of the circuit breaker 2 and in the enclosure 3C of the disconnecting switch 3. In this case, the gas spaces of the enclosures 2C and 3C are partitioned by an insulating spacer that also serves to support the conductor arranged in the connecting portion between the enclosure 2C and the enclosure 3C.

In the hybrid type gas insulating switch gear apparatus of the construction described above, the circuit breaker 2 and the bushing 1 are independent of each other. Also, the circuit breaker 2 and the disconnecting switch 3 are housed in the different enclosures 2C and 3C. In addition, the enclosure 2C is installed such that the axis of the enclosure 2C is parallel to the installing plane, and the enclosure 3C is arranged such that the axis of the enclosure 3C is perpendicular to the installing plane. It follows that the entire hybrid type gas insulation switch gear apparatus is rendered bulky and heavy, with the result that a large installing area is required and the apparatus cost is rendered high.

In addition, it is necessary to install two current transformers for the discrimination between an accident in the circuit breaker and another accident in another portion.

BRIEF SUMMARY OF THE INVENTION

An object of the present invention is to provide a hybrid type gas insulation switch gear apparatus, which permits miniaturizing and decreasing the weight of the entire apparatus and also permits decreasing the manufacturing cost.

For achieving the object described above, the hybrid type gas insulation switch gear apparatus of the present invention is constructed as summarized below.

According to a first aspect of the present invention, there is provided a hybrid type gas insulation switch gear apparatus, comprising:

a main enclosure including a first cylindrical section having a base and a second cylindrical section branched from the base of the first cylindrical section and obliquely extending from the first cylindrical section, the first and second cylindrical sections having first and second opening sections;

an insulating bushing mounted to the first opening section and including a hollow insulating housing and a conductor extended in the hollow insulating housing;

an insulating enclosure mounted to the second opening section and communicated with the second cylindrical section, an insulating gas being sealed in the main enclosure, the insulating bushing and the insulating enclosure;

a first fixed electrode electrically connected to the conductor and a first movable electrode which are received in the first cylindrical section to form a disconnecting switch;

an insulating member configured to support the first fixed electrode on the first cylindrical section;

a connecting conductor electrically connected to the first movable electrode of the disconnecting switch, arranged in the first cylindrical section, and including a branched conductor extending in the second cylinder;

a main electrode provided in the insulating enclosure;

a second movable electrode provided in the insulating enclosure and configured to be moved to the main electrode and electrically connected to the main electrode and the branched conductor to form a circuit breaker connected to the disconnecting switch in series;

a current transformer arranged around the second cylindrical section to detect a current flowing through the connecting conductor; and a first earth switch mounted to the first cylindrical section and including a movable counter electrode configured to connect and disconnect the fixed electrode of the disconnecting switch to the ground.

According to a second aspect of the present invention, there is provided a hybrid type gas insulation switch gear apparatus, comprising:

a main enclosure including a first cylindrical section having a base and a second cylindrical section branched from the base of the first cylindrical section and obliquely extending from the first cylindrical section, the first and second cylindrical sections having first and second opening sections;

an insulating bushing mounted to the second opening section and including a hollow insulating housing and a conductor extended in the hollow insulating housing;

an insulating enclosure mounted to the first opening section and communicated with the second cylindrical section, an insulating gas being sealed in the main enclosure, the insulating bushing and the insulating enclosure;

a first fixed electrode and a first movable electrode which are received in the first cylindrical section to form a disconnecting switch;

a first connecting conductor electrically connected to the first movable electrode of the disconnecting switch, arranged in the first cylindrical section, and including a branched conductor extending in the second cylinder electrically connected to the conductor;

a first insulating member configured to support the branched conductor and the conductor on the second cylindrical section;

a main electrode provided in the insulating enclosure;

a second movable electrode provided in the insulating enclosure and configured to be moved to the main electrode and electrically connected to the main electrode to form a circuit breaker;

a second connecting conductor connected to the second movable electrode of the circuit breaker and the fixed electrode of the disconnecting switch, the circuit breaker, the second connecting conductor and the disconnecting switch being arranged substantially in line;

a current transformer arranged around the first cylindrical section to detect a current flowing through the second connecting conductor; and an earth switch mounted to the first cylindrical section and including a movable counter electrode configured to connect and disconnected the fixed electrode of the disconnecting switch to the ground.

According to a third aspect of the present invention, there is provided a hybrid type gas insulation switch gear apparatus, comprising:

a main enclosure including a first cylindrical section having a base and second and third cylindrical sections branched from the base of the first cylindrical section and obliquely extending from the first cylindrical section, the first, second and third cylindrical sections having first, second and third opening sections;

first and second insulating bushings mounted to the first and second opening sections, each including a hollow insulating housing and a conductor extended in the hollow insulating housing;

an insulating enclosure mounted to the third opening section and communicated with the second cylindrical section, an insulating gas being sealed in the main enclosure, the first and second insulating bushings, and the insulating enclosure;

first and second fixed electrodes electrically connected to the corresponding conductor of the bushings and first and second movable electrodes, the first fixed and movable electrodes being received in the first cylindrical section to form a first disconnecting switch and second fixed and movable electrodes being received in the second cylindrical section to form a second disconnecting switch;

first and second insulating members configured to support the first and second fixed electrodes on the first and second cylindrical sections;

a connecting conductor including a base conductor section and first and second branched conductor sections extending from the base conductor section in the second and third cylinder sections, the base and second conductor sections being electrically connected to the first and second movable electrodes of the first and second disconnecting switches; and a main electrode provided on the insulating enclosure;

a third movable electrode provided in the insulating enclosure and configured to be moved to the main electrode and electrically connected to the main electrode and the first branched conductor to form a circuit breaker, the circuit breaker being connected to the first and second disconnecting switches in series;

a current transformer arranged around the second cylindrical section to detect a current flowing through the connecting conductor; and an earth switch mounted to the first cylindrical section and including a movable counter electrode configured to connect and disconnected the fixed electrode of the disconnecting switch to the ground.

According to a fourth aspect of the present invention, there is provided a hybrid type gas insulation switch gear apparatus, comprising:

a main enclosure including a first cylindrical section having a base and a second cylindrical section branched from the base of the first cylindrical section and obliquely extending from the first cylindrical section, the first and second cylindrical sections having first and second opening sections;

an insulating bushing mounted to the second opening section and including a hollow insulating housing and a conductor extended in the hollow insulating housing;

an insulating enclosure mounted to the first opening section and communicated with the first cylindrical section, an insulating gas being sealed in the main enclosure, the insulating bushing and the insulating enclosure;

a fixed electrode electrically connected to the conductor and a movable electrode which are received in the second cylindrical section to form a disconnecting switch;

an insulating member configured to support the first fixed electrode of the disconnecting switch on the second cylindrical section;

a connecting conductor arranged in the first cylindrical section, and including a branched conductor extending in the second cylinder and connected to the first movable switch of the disconnecting switch;

a main electrode provided on the insulating enclosure;

a movable electrode provided in the insulating enclosure and configured to be moved to the main electrode and electrically connected to the main electrode and the branched conductor to form a circuit breaker, the circuit breaker being connected to the disconnecting switch in series;

a current transformer arranged around the first cylindrical section to detect a current flowing through the connecting conductor; and an earth switch mounted to the second cylindrical section and including a movable counter electrode configured to connect and disconnected the fixed electrode of the disconnecting switch to the ground.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate presently preferred embodiments of the present invention, and together with the general description given above and the detailed description of the preferred embodiments given below, serve to explain the principles of the present invention.

FIG. 16 is a cross sectional view schematically showing the construction of a hybrid type gas insulation switch gear apparatus according to a thirteenth embodiment of the present invention;

DETAILED DESCRIPTION OF THE INVENTION

Some embodiments of the hybrid type gas insulation switch gear apparatus of the present invention will now be described with reference to the accompanying drawings.

Figure 1:
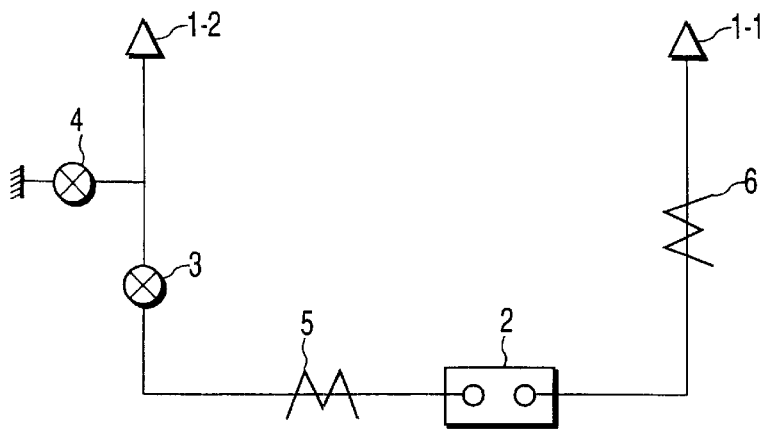
FIG. 1 is a circuit diagram schematically showing the circuit of the conventional hybrid type gas insulation switch gear apparatus.
Figure 2:
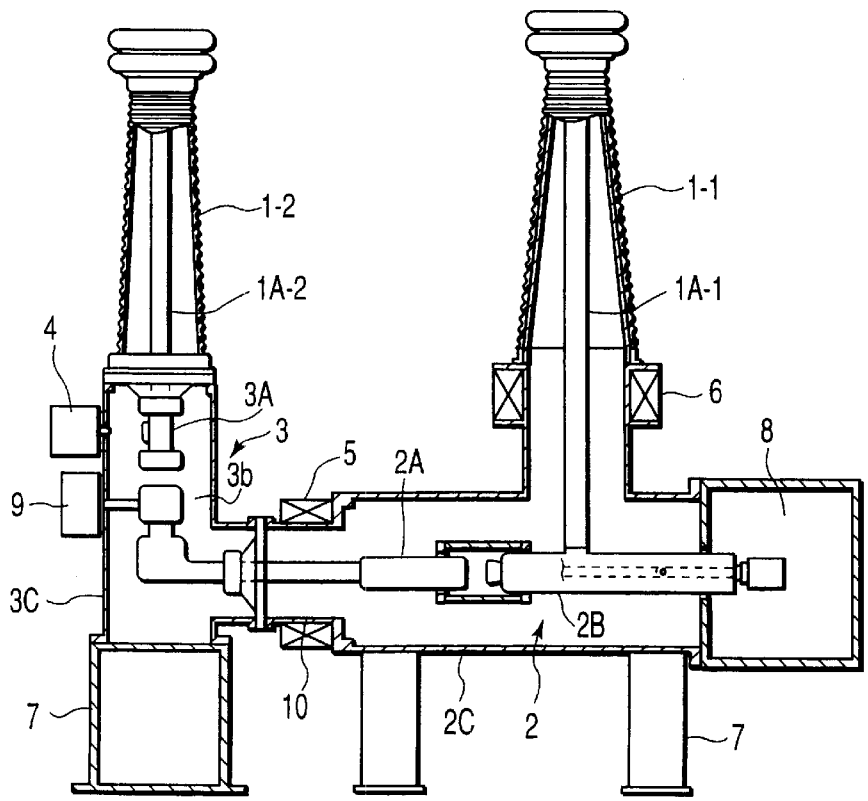
FIG. 2 is a cross sectional view schematically showing the construction of the conventional hybrid type gas insulation switch gear apparatus.
Figure 3:
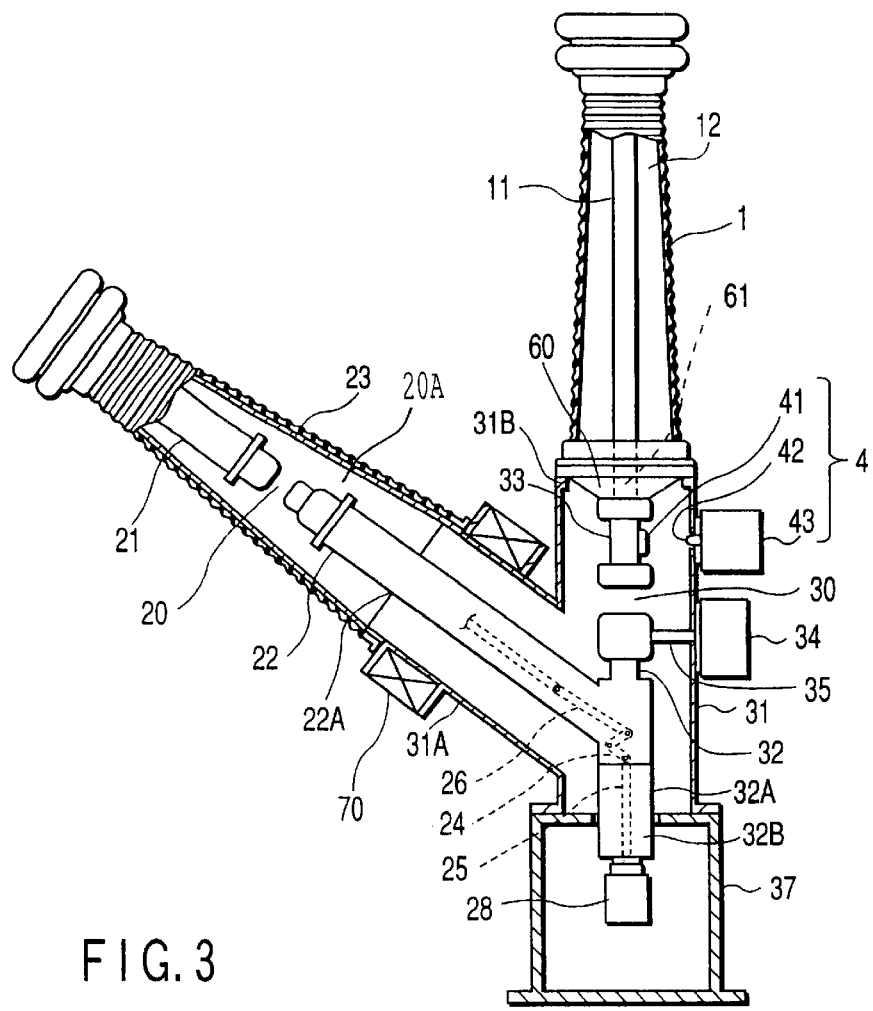
FIG. 3 is a cross sectional view schematically showing the construction of a hybrid type gas insulation switch gear apparatus according to a first embodiment of the present invention.
Figure 4:
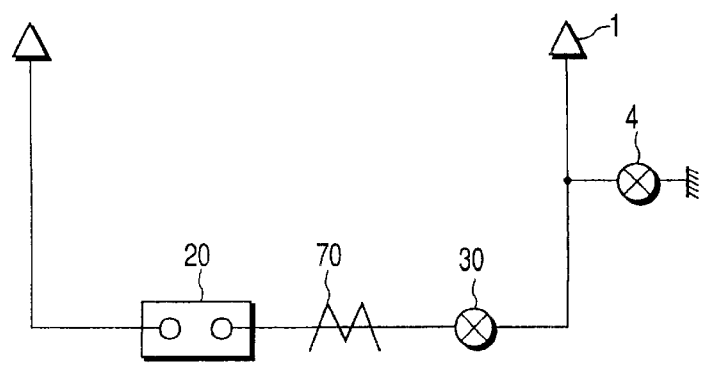
FIG. 4 is a circuit diagram schematically showing the circuit of the hybrid type gas insulation switch gear apparatus shown in FIG. 3.

FIGS. 3 and 4 collectively show a hybrid type gas insulation switch gear apparatus according to first embodiment of the present invention, wherein FIG. 3 is a cross sectional view schematically showing the construction of the hybrid type gas insulation switch gear apparatus according to the first embodiment of the present invention, and FIG. 4 is a circuit diagram showing the circuit of the hybrid type gas insulation switch gear apparatus shown in FIG. 3.

In FIG. 3, a reference numeral 31 denotes an enclosure of a disconnecting switch 30. The enclosure 31 is substantially V-shaped, and comprises a cylindrical main housing 31B extending substantially in a vertical direction and a cylindrical branched section 31A branched from the circumferential surface of the cylindrical main housing 31B and extending in an inclined fashion obliquely upward. The enclosure 31 is mounted to a supporting frame 37 such that the axis of the enclosure 31 is perpendicular to the installing plane of the electric power station.

Housed in the enclosure 31 are a fixed electrode 33 and a movable electrode 32 capable of movement to contact the fixed electrode 33, which constitute a disconnecting switch 30. The fixed electrode 33 and the movable electrode 32 are arranged on the same axis. An insulating spacer 60 is arranged in an upper open portion of the enclosure 31. An electrode 61 mounted to one end of a conductor 11 is supported by and fixed to the spacer 60, and the fixed electrode 33 is electrically connected to the electrode 61. Also, the movable electrode 32 is movably supported by a hollow conductor 32A mounted to the supporting frame 37.

A bushing 12 is mounted to the insulating spacer 60 arranged in the upper opening of the enclosure 31 independently of the enclosure 31 of the disconnecting switch 30. The bushing 12 is made of insulating material such as a ceramic or porcelain. In the bushing 12, a hollow porcelain 1 is mounted on the enclosure 31, and the conductor 11 extends inside the hollow porcelain 1. The conductor 11 is electrically connected to the electrode 61 mounted to the insulating spacer 60, as described previously.

A primary electrode 41 constituting the earth switch 4 is mounted to a part of the circumferential surface of the fixed electrode 33. Also, an operating mechanism 43 for operating the earth switch 4 is mounted to the outer circumferential surface of the enclosure 31. The earth switch operating mechanism 43 performs the function of moving the movable electrode 42 constituting the earth switch 4 such that the movable electrode 42 is capable of contact with the primary electrode 41. The movable electrode 42 is brought into contact with the primary electrode 41 by the operating mechanism 43 so as to electrically connect the fixed electrode 33 to the ground. Also, the movable electrode 42 is moved away from the primary electrode 41 by the operating mechanism 43 so as to electrically disconnect the fixed electrode 33 from the ground.

An operating mechanism 34 for operating the movable electrode 32 is mounted to the outer circumferential surface of the enclosure 31. The operating mechanism 34 includes an operating rod 35 for moving the movable electrode 32. The operating rod 35 is moved by the operating mechanism 34, with the result that the movable portion of the movable electrode 32 is moved toward or away from the fixed electrode. To be more specific, the movable portion of the movable electrode 32 is brought into contact with the stationary electrode of the fixed electrode 33 so as to achieve an electrical connection between the movable electrode 32 and the fixed electrode 33. Also, the movable portion of the movable electrode 32 is moved away from the stationary electrode of the fixed electrode 33 so as to achieve an electrical disconnection between the movable electrode 32 and the fixed electrode 33.

On the other hand, in a circuit breaker 20, a porcelain enclosure 23 performing the function of a bushing is mounted to the open edge of the cylindrical branched portion 31A extending from the enclosure 31 of the disconnection switch chamber 30 to the circuit breaker 20. Arranged in the porcelain enclosure 23 are a fixed electrode 21 and a movable electrode 22 capable of movement to contact the fixed electrode 21, which constitute the circuit breaker 20. The fixed electrode 21 and the movable electrode 22 are arranged on the same axis. It should be noted that the porcelain enclosure 23 performs the function of a bushing and also performs the interrupting chamber 20A for the circuit breaker 20. The fixed electrode 21 is mounted to the tip portion of the porcelain enclosure 23, and the movable electrode 22 is connected to a hollow conductor 32A of the movable electrode 32 via a hollow conductor 22A, the hollow conductor 32A communicating with said hollow conductor 22A. In other words, the movable electrode 32 is formed in substantially Y-shape such that the hollow conductor 22A and the hollow conductor 32A have a common proximal end portion so as to communicate with each other.

The hollow conductor 32A is supported on a supporting member 32B fixed on the supporting frame 37. An operating mechanism 28 for operating the circuit breaker is mounted to the lower edge portion of the supporting member 32B mounted to the supporting frame 37. The circuit breaker operating mechanism 28 includes an operating rod 25 operated by the operating mechanism 28, a changing lever 24 extending within the hollow conductor 22A, the hollow conductor 32A and the supporting member 32B and joined to the operating rod 25 so as to change the direction of the driving force transmitted from the operating rod 25, and a link 26 arranged within the hollow conductor 22A, joined via the changing lever 24 and imparted with the driving force whose direction has been changed by the changing lever 24. The link 26 is connected to the movable electrode 22 on the side of the interrupting chamber 20A of the circuit breaker 20. If the driving force is imparted from the operating rod 25 to the link 26, the movable electrode 22 of the circuit breaker 20 is moved toward and away from the stationary electrode of the fixed electrode 21.

Further, a current transformer 70 is mounted to the outer circumferential surface of the interrupting chamber 20A in a manner to surround the hollow conductor 22A. To be more specific, the current transformer 70 is mounted in the vicinity of the open edge portion of the cylindrical branched portion 31A of the enclosure 31.

Incidentally, an insulating gas such as a $SF_6$ gas is sealed in the enclosure 31 of the disconnecting switch 30 and in the porcelain enclosure 23 mounted to the cylindrical branched portion 31A.

In the hybrid type gas insulation switch gear apparatus of the construction described above, the cylindrical branched portion 31A is arranged in the enclosure 31 of the disconnecting switch 30, the porcelain enclosure 23 is mounted to the cylindrical branched portion 31A, and the fixed electrode 21 and the movable electrode 22 of the circuit breaker 20 are housed in the porcelain enclosure 23. It follows that the porcelain enclosure 23 performs the function of the bushing consisting of the hollow porcelain and the conductor, making it unnecessary to arrange an independent bushing. In this case, it suffices to arrange a single bushing 12 on the side of the enclosure 31 of the disconnecting switch 30. It should also be noted that, since the circuit breaker 20 is arranged within the porcelain enclosure 23, a short-circuiting accident of the circuit breaker 20 is minimized so that a reliability of the circuit breaker can be improved.

Figure 5:
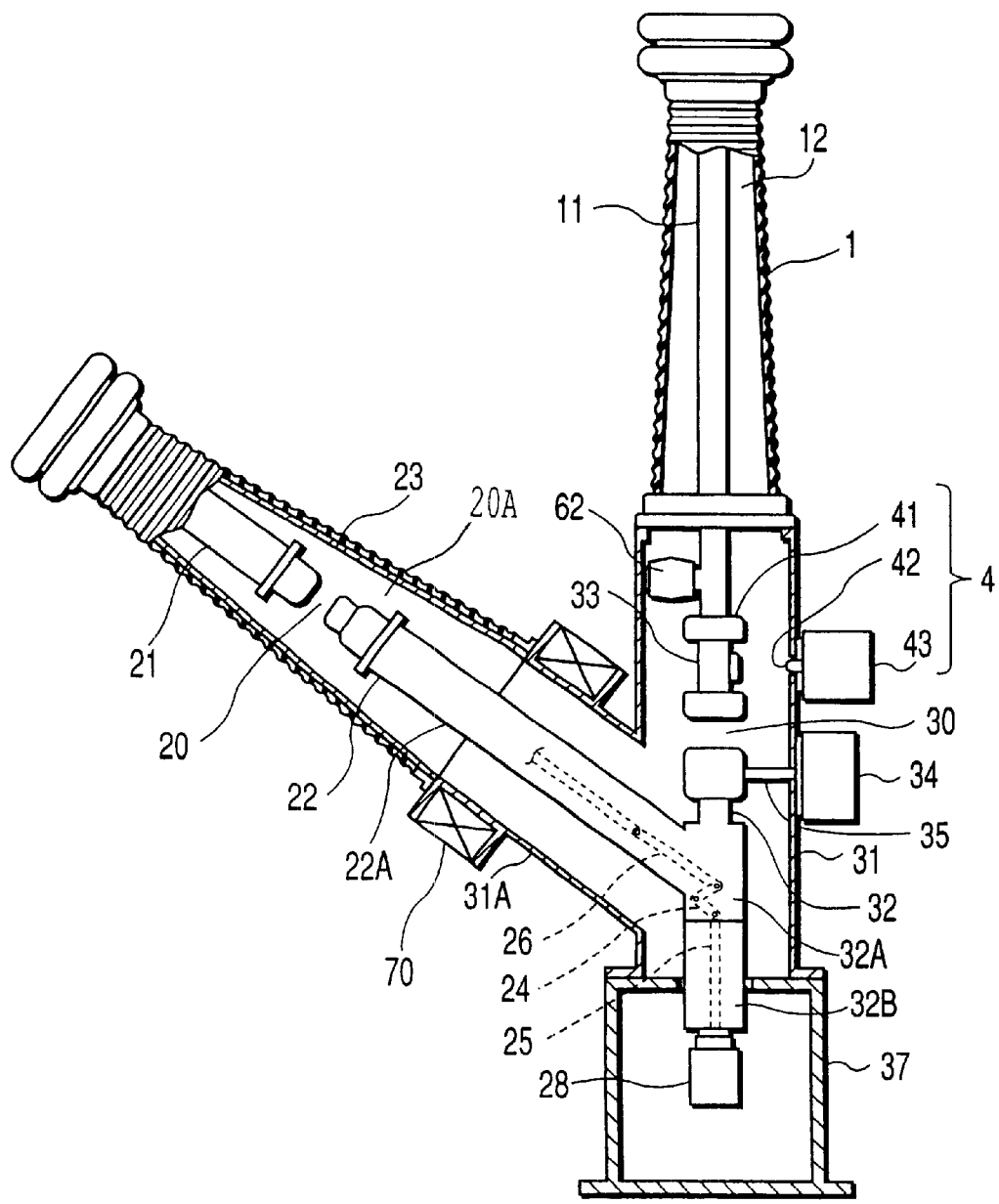
FIG. 5 is a cross sectional view schematically showing the construction of a hybrid type gas insulation switch gear apparatus according to a second embodiment of the present invention.

FIG. 5 shows the construction of a hybrid type gas insulation switch gear apparatus according to a second embodiment of the present invention. The members of the apparatus common with FIGS. 3 and 5 are denoted by the same reference numerals so as to avoid the overlapping description.

In the hybrid type gas insulation switch gear apparatus according to the second embodiment of the present invention, a substantially columnar insulating member 62 is used in place of the insulating spacer for supporting and fixing the fixed electrode 33 of the disconnecting switch 30. As shown in FIG. 5, the substantially columnar insulating member 62 is coupled at one end to the conductor 11 of the bushing 1 and also coupled at the other end to the enclosure 31.

The hybrid type gas insulation switch gear apparatus of the particular construction is simpler in construction than the apparatus according to the first embodiment of the present invention.

Figure 6:
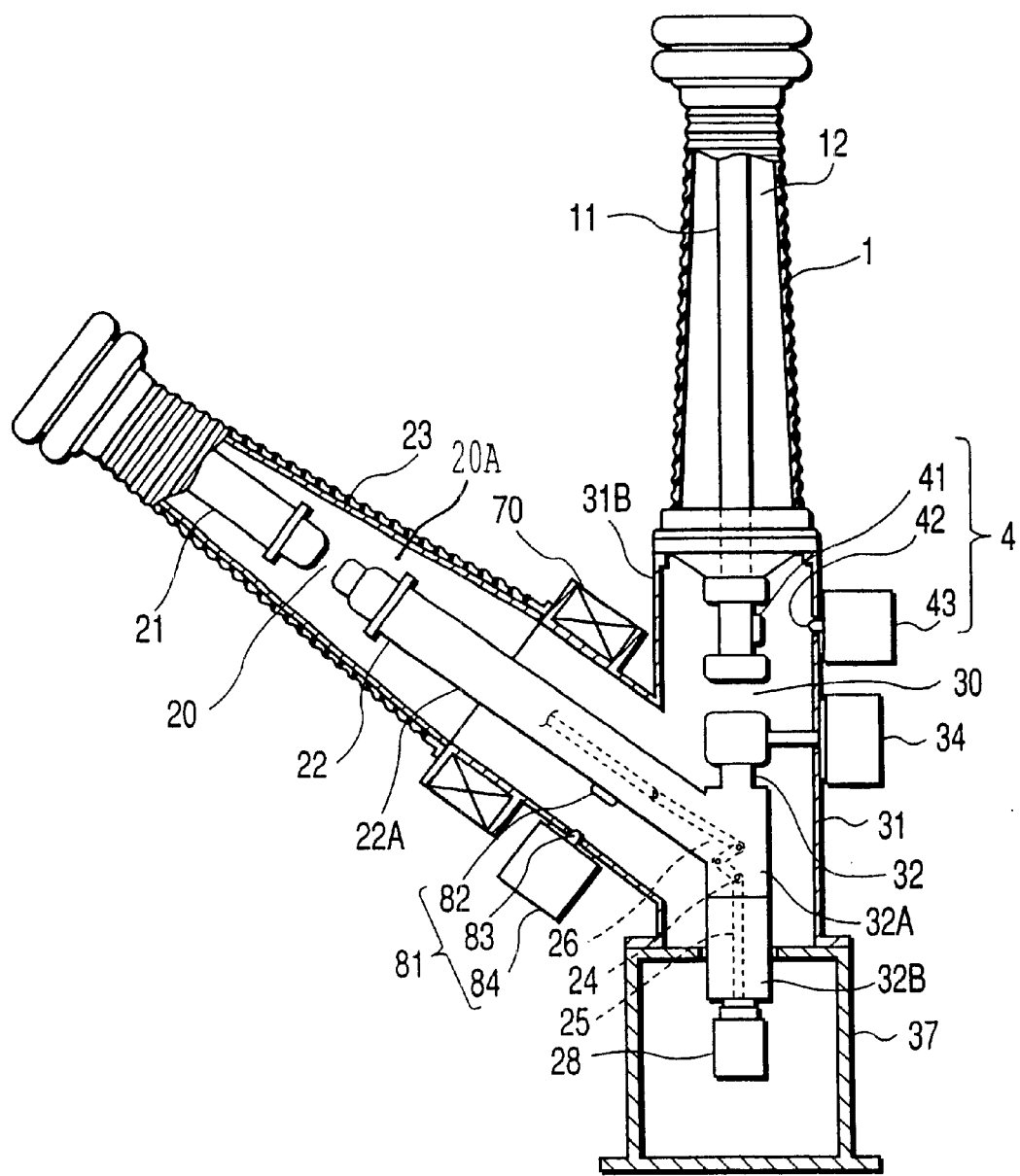
FIG. 6 is a cross sectional view schematically showing the construction of a hybrid type gas insulation switch gear apparatus according to a third embodiment of the present invention.

FIG. 6 shows the construction of a hybrid type gas insulation switch gear apparatus according to a third embodiment of the present invention. The members of the apparatus common with FIGS. 3 and 6 are denoted by the same reference numerals so as to avoid the overlapping description.

In the hybrid type gas insulation switch gear apparatus according to the third embodiment of the present invention, a primary electrode 82 of a second earth switch 81 is mounted to the outer circumferential surface of the hollow conductor 22A extending toward the movable electrode 22 of the circuit breaker 20, and an earth switch operating mechanism 84 for moving the movable electrode 83 toward and away from the primary electrode 82 is mounted to the outer circumferential surface of the cylindrical branched portion 31A of the enclosure 31, as shown in FIG. 6.

In the hybrid type gas insulation switch gear apparatus of the particular construction, the earth switch 81 is arranged between the circuit breaker 20 and the disconnecting switch 30. It follows that it is possible to lower easily the potential of the hollow conductor 22A to the ground potential during the inspecting operation, thereby improving the safety of the inspecting operation.

Figure 7:
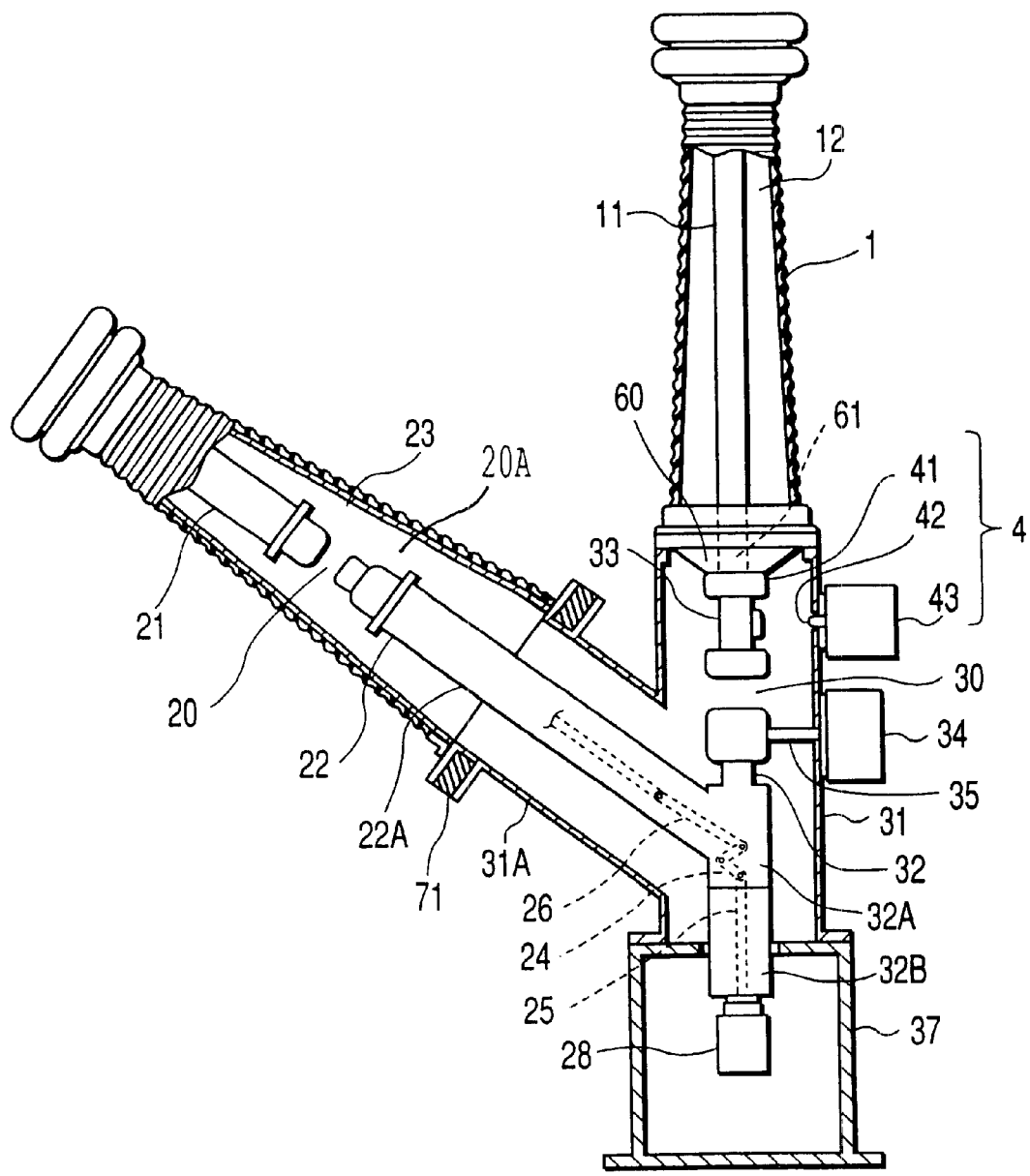
FIG. 7 is a cross sectional view schematically showing the construction of a hybrid type gas insulation switch gear apparatus according to a fourth embodiment of the present invention.

FIG. 7 shows the construction of a hybrid type gas insulation switch gear apparatus according to a fourth embodiment of the present invention. The members of the apparatus common with FIGS. 3 and 7 are denoted by the same reference numerals so as to avoid the overlapping description.

In the hybrid type gas insulation switch gear apparatus according to the fourth embodiment of the present invention, a light transforming type current transformer 71 is mounted as a current transformer to the outer circumferential surface in the vicinity of the open edge portion of the cylindrical branched portion 31A of the disconnecting switch 30. As shown in FIG. 7, the current transformer 71 is mounted to surround the hollow conductor 22A extending toward the movable electrode 22 of the circuit breaker 20.

In the hybrid type gas insulation switch gear apparatus of the particular construction, the light transforming type current transformer 71, which is lightweight, can be mounted in place of the current transformer according to the first embodiment of the present invention, with the result that the apparatus can be more lightweight and simpler in construction.

Figure 8:
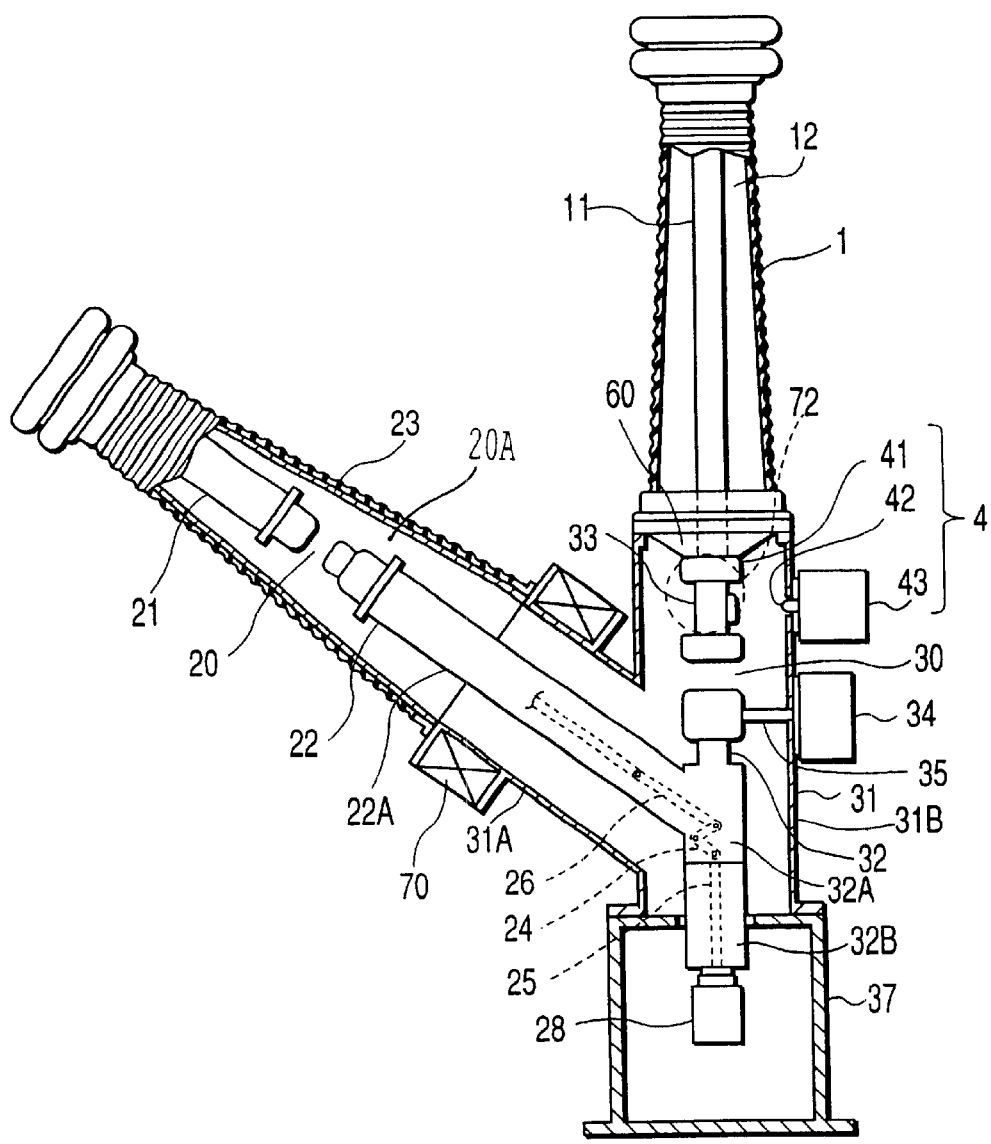
FIG. 8 is a cross sectional view schematically showing the construction of a hybrid type gas insulation switch gear apparatus according to a fifth embodiment of the present invention.

FIG. 8 shows the construction of a hybrid type gas insulation switch gear apparatus according to a fifth embodiment of the present invention. The members of the apparatus common with FIGS. 3 and 8 are denoted by the same reference numerals so as to avoid the overlapping description.

In the hybrid type gas insulation switch gear apparatus according to the fifth embodiment of the present invention, arranged is a voltage transformer 72 for measuring the system voltage in conformity with the fixed electrode 33 of the disconnecting switch 30 connected to the bushing 1, as shown in FIG. 8.

In the hybrid type gas insulation switch gear apparatus of the particular construction, the voltage transformer 72 is incorporated in addition to the current transformer 70. It follows that the voltage can be measured in addition to the current measurement, thereby allowing the apparatus to perform multiple functions.

Figure 9:
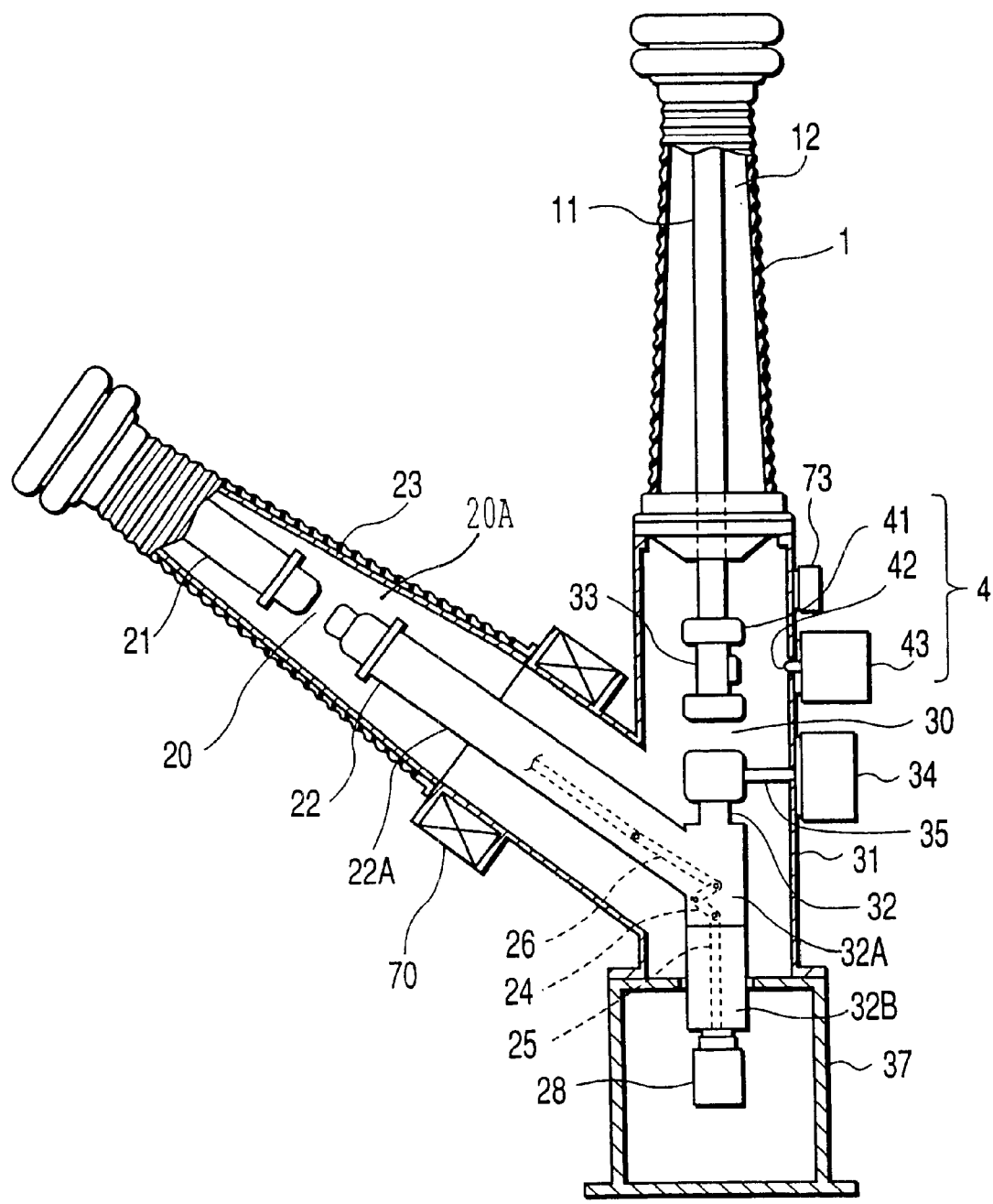
FIG. 9 is a cross sectional view schematically showing the construction of a hybrid type gas insulation switch gear apparatus according to a sixth embodiment of the present invention.

FIG. 9 shows the construction of a hybrid type gas insulation switch gear apparatus according to a sixth embodiment of the present invention. The members of the apparatus common with FIGS. 3 and 9 are denoted by the same reference numerals so as to avoid the overlapping description.

In the hybrid type gas insulation switch gear apparatus according to the sixth embodiment of the present invention, a voltage transformer 73 such as a light transforming type divider is arranged as a device for measuring the system voltage on the outer circumferential surface in the upper portion of the enclosure 31 of the system disconnecting switch 30. As shown in FIG. 9, the light transforming type voltage transformer 73 is arranged in a manner to surround the conductor portion at which the fixed electrode 33 is connected to the conductor 11 of the bushing 1.

The hybrid type gas insulation switch gear apparatus of the particular construction permits making the apparatus lightweight and also permits simplifying the construction of the apparatus.

Figure 10:
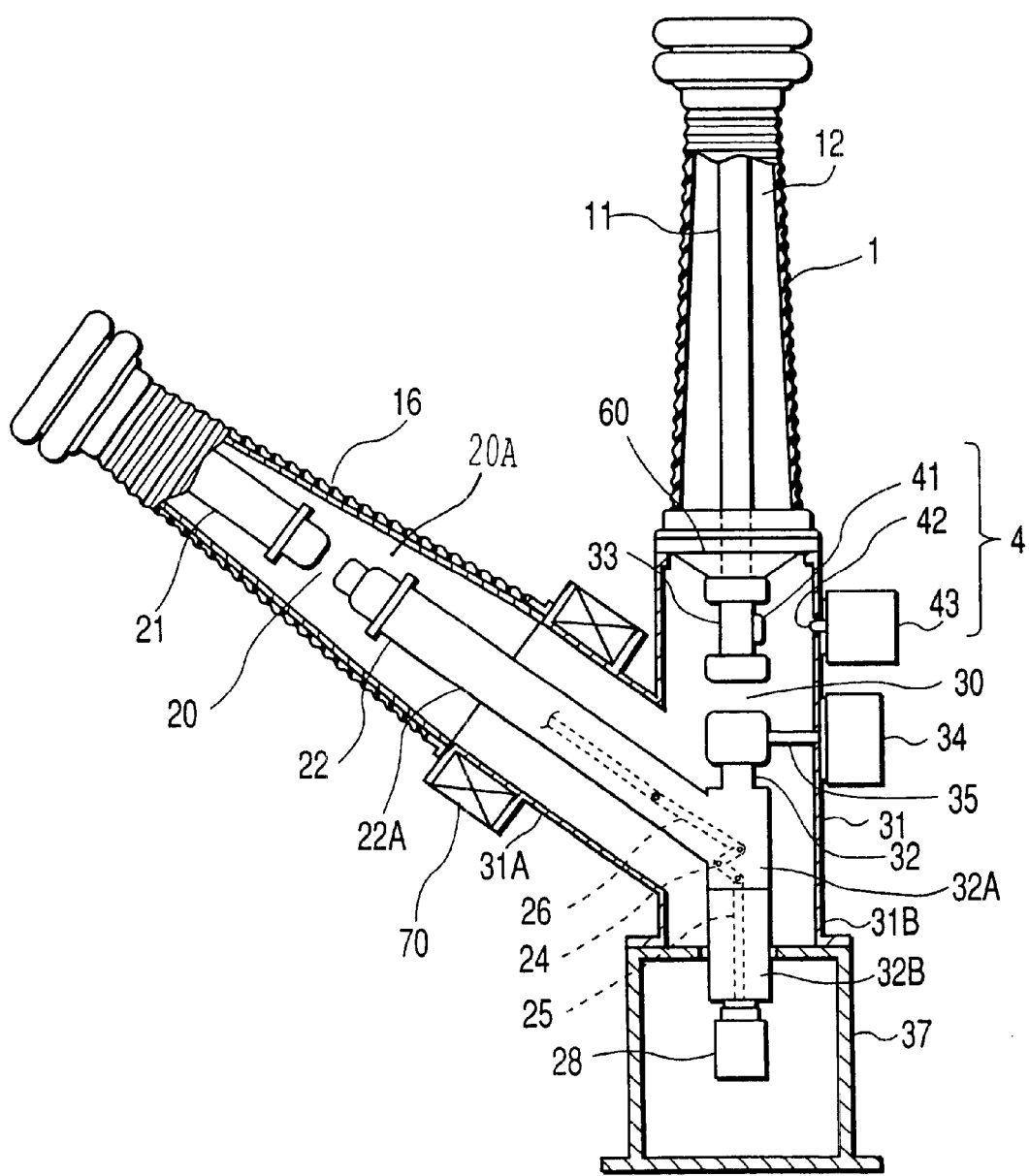
FIG. 10 is a cross sectional view schematically showing the construction of a hybrid type gas insulation switch gear apparatus according to a seventh embodiment of the present invention.

FIG. 10 shows the construction of a hybrid type gas insulation switch gear apparatus according to a seventh embodiment of the present invention. The members of the apparatus common with FIGS. 3 and 10 are denoted by the same reference numerals so as to avoid the overlapping description.

In the hybrid type gas insulation switch gear apparatus according to the seventh embodiment of the present invention, the bushings 15, 16 may be made of FRP, rubber, etc. in place of the bushing 1 mounted to the enclosure 31 of the disconnecting switch 30 and the bushing mounted to the cylindrical branched portion 31A, as shown in FIG. 10.

The hybrid type gas insulation switch gear apparatus of the particular construction permits markedly decreasing the weight of the entire apparatus.

Figure 11:
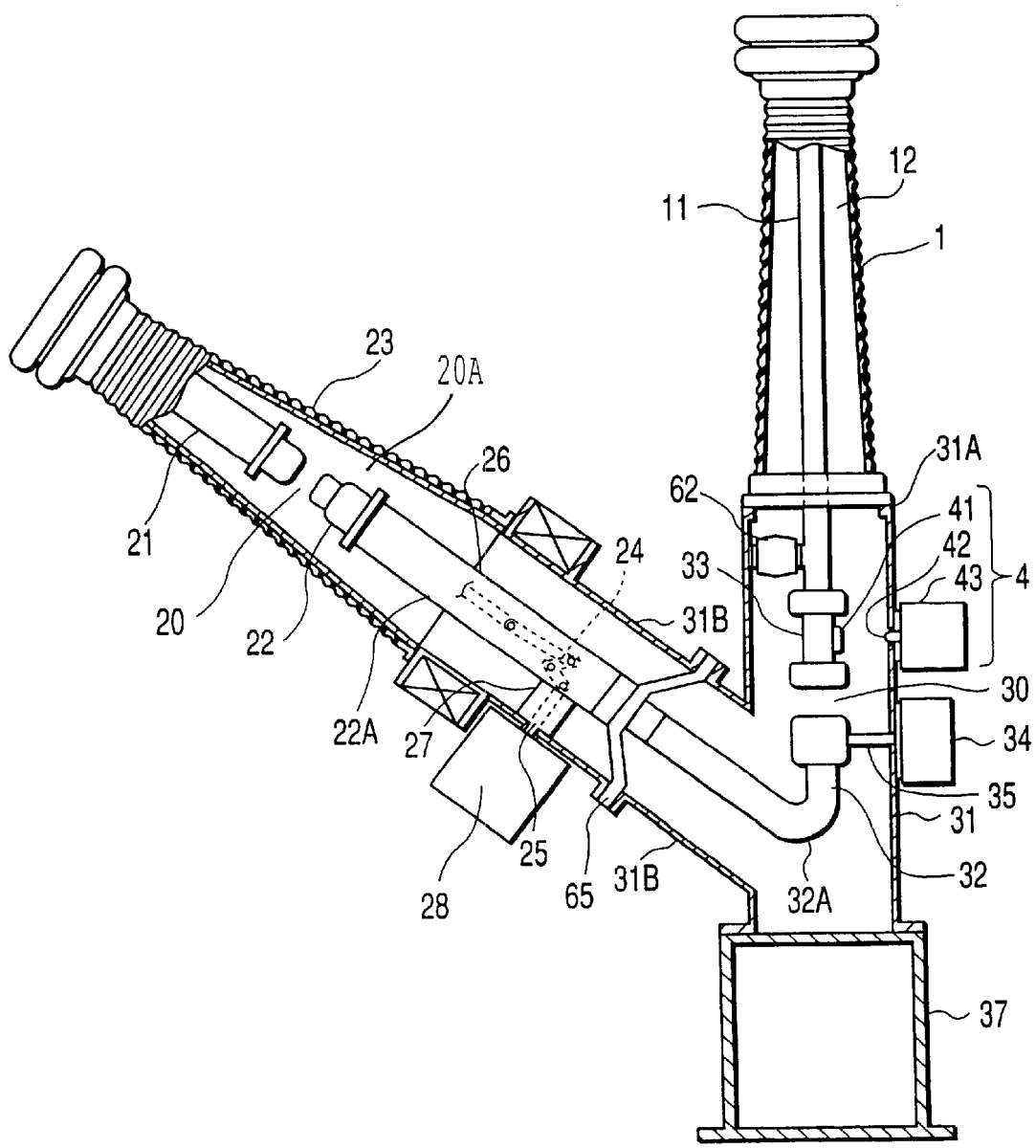
FIG. 11 is a cross sectional view schematically showing the construction of a hybrid type gas insulation switch gear apparatus according to an eighth embodiment of the present invention.

FIG. 11 shows the construction of a hybrid type gas insulation switch gear apparatus according to an eighth embodiment of the present invention. The members of the apparatus common with FIGS. 3 and 11 are denoted by the same reference numerals so as to avoid the overlapping description.

In the hybrid type gas insulation switch gear apparatus according to the eighth embodiment of the present invention, a cylindrical body 31B is joined to the short cylindrical branched portion 31A arranged in the enclosure 31 of the disconnecting switch 30, as shown in FIG. 11. In addition, a porcelain enclosure 23, which also acts as a bushing, is mounted to the open edge of the cylindrical body 31B. Further, the fixed electrode 21 of the circuit breaker 20 and the movable electrode 22 capable of movement to contact the fixed electrode 21 are arranged on the same axis within the porcelain enclosure 23. A hollow conductor 32A arranged within the cylindrical branched portion 31A for supporting the movable electrode 32 is bent to be positioned on the axis of the cylindrical branched portion 31A and is supported by an insulating spacer 65 interposed between the hollow conductor 32A itself and the cylindrical body 31B joined to the open edge of the cylindrical branched portion 31A. Also, the hollow conductor 32A supported by the insulating spacer is joined to the hollow conductor 22A connected to the movable electrode 22 of the circuit breaker 20. Further, an operating mechanism 28 is mounted to the outer circumferential surface of the cylindrical body 31B corresponding to the lower edge portion of the hollows conductor 22A. Still further, the operating rod 25 operated by the circuit breaker operating mechanism 28 and the link 26 joined to the operating rod 25 via the changing lever 24 and movable toward and away from the stationary electrode of the fixed electrode 21 are inserted into the hollow conductor 22A on the side of the movable electrode 22 of the circuit breaker 20. In this case, the operating rod 25 is inserted through the insulating member 27 so as to be joined to the changing lever 24.

In the hybrid type gas insulation switch gear apparatus of the particular construction, the substantially columnar insulating member 62 is mounted at one end portion to the conductor portion of the fixed electrode 30 connected to the conductor 11 of the bushing 1 and is fixed at the other end to the enclosure 31, as in the embodiment shown in FIG. 4.

In the hybrid type gas insulation switch gear apparatus of the particular construction, the gas within the disconnecting switch and the circuit breaker is partitioned by the insulating spacer 65 so as to improve the safety in the inspecting operation.

Figure 12:
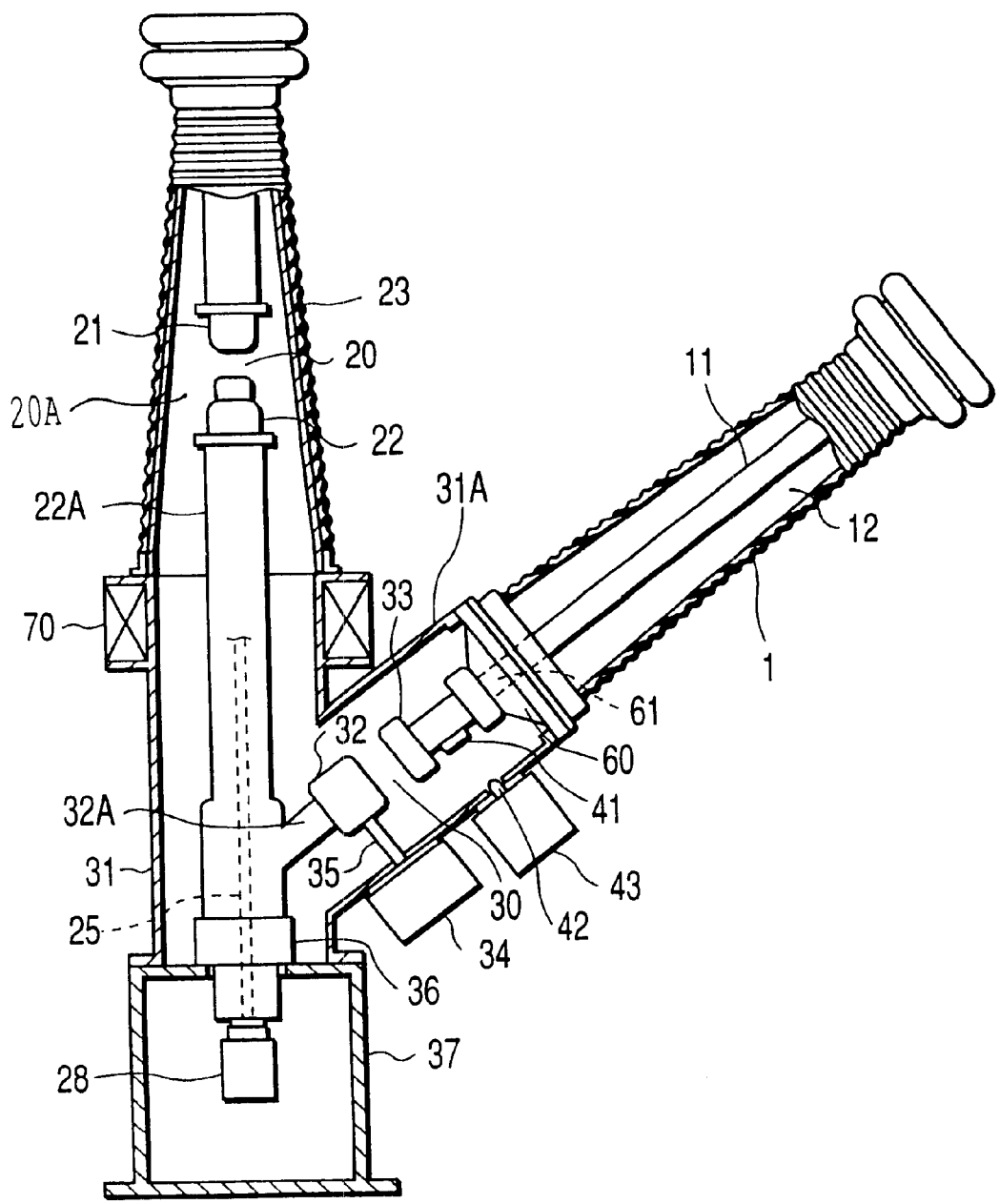
FIG. 12 is a cross sectional view schematically showing the construction of a hybrid type gas insulation switch gear apparatus according to a ninth embodiment of the present invention.

FIG. 12 shows the construction of a hybrid type gas insulation switch gear apparatus according to a ninth embodiment of the present invention. The members of the apparatus common with FIGS. 3 and 12 are denoted by the same reference numerals so as to avoid the overlapping description.

A reference numeral 31 shown in FIG. 12 denotes an enclosure for the circuit breaker 20 and the disconnector 30, which has a cylindrical branched portion 31A formed by branching obliquely upward a part of the circumferential surface of the cylindrical body. The enclosure 31 is mounted to a supporting frame 37 such that the axis of the enclosure 31 is perpendicular to the installing plane.

The porcelain enclosure 23 performing the function of a bushing is mounted to the open edge of the enclosure 31, and the fixed electrode 21 and the movable electrode 22 capable of movement to contact the fixed electrode 21 are mounted on the same axis within the interrupting enclosure 20A of the circuit breaker 20. The fixed electrode 21 is mounted to the tip portion of the porcelain enclosure 23, and the movable electrode 22 is vertically mounted to the supporting frame 37 by the supporting frame 37 via the hollow conductor 22A.

The circuit breaker operating mechanism 28 is mounted to the lower edge portion of the hollow conductor 22A on the side of the movable electrode 22 mounted to the supporting frame 37. If the circuit breaker operating mechanism 28 is operated, the operating rod 25 is inserted through the hollow conductor 22A of the circuit breaker 20 so as to allow the movable electrode 22 to be connected to or disconnected from the fixed electrode 21.

Further, within the circuit breaker 20, the current transformer 70 is mounted to the outer circumferential surface in the vicinity of the open edge portion of the enclosure 31 in a manner to surround the hollow conductor 22A on the side of the movable electrode 22.

On the other hand, the fixed electrode 33 of the disconnecting switch 30 and the movable electrode 32 movable to contact the fixed electrode 33 are mounted on the same axis within the cylindrical branched portion 31A of the enclosure 31. The fixed electrode 33 is mounted to an electrode 61 of an insulating spacer 60 mounted to the upper open edge of the cylindrical branched portion 31A, and the movable electrode 32 is movably supported by a hollow conductor 32A connected in a communicating manner to the hollow conductor 22A on the side of the interrupting chamber 20A mounted to the supporting frame 37.

The bushing 1 having the conductor 11 arranged within the bushing 12 is mounted to the insulating spacer 60 mounted to the upper open edge of the cylindrical branched portion 31A of the enclosure 31. The conductor 11 extends through the insulating spacer 60 so as to be electrically connected to the fixed electrode 33.

The primary electrode 41 of the earth switch 4 is mounted to a part on the circumferential surface of the fixed electrode 33, and an earth switch operating mechanism 43 is mounted to the outer circumferential surface of the cylindrical branched portion 31A corresponding to the primary electrode 41. The earth switch operating mechanism 43 is operated to permit the movable electrode 42 to be brought into contact with and to be moved away from the primary electrode 41.

An operating mechanism 34 is mounted to the outer circumferential surface of the cylindrical branched portion 31A corresponding to the movable electrode 32. The operating mechanism 34 operates the operating rod 35 to permit the movable electrode of the movable electrode section 32 to be brought into contact with or to be moved away from the stationary electrode of the fixed electrode section 33.

Incidentally, an insulating gas such as a $SF_6$ gas is sealed in the enclosure 31 of the circuit breaker 20, the porcelain enclosure 23 mounted to the enclosure 31, and in the cylindrical branched portion 31A.

In the hybrid type gas insulation switch gear apparatus according to the ninth embodiment of the present invention, which is constructed as described above, it is possible to obtain the function and the effect similar to those obtained in the apparatus according to the first embodiment of the present invention. In addition, since the hollow conductor 22A on the side of the movable electrode 22 of the circuit breaker 20 can be mounted substantially linearly to the supporting frame 37 via the insulating supporting member 38, it is possible to simplify the construction of the operating mechanism for driving the movable electrode of the circuit breaker 20.

Figure 13:
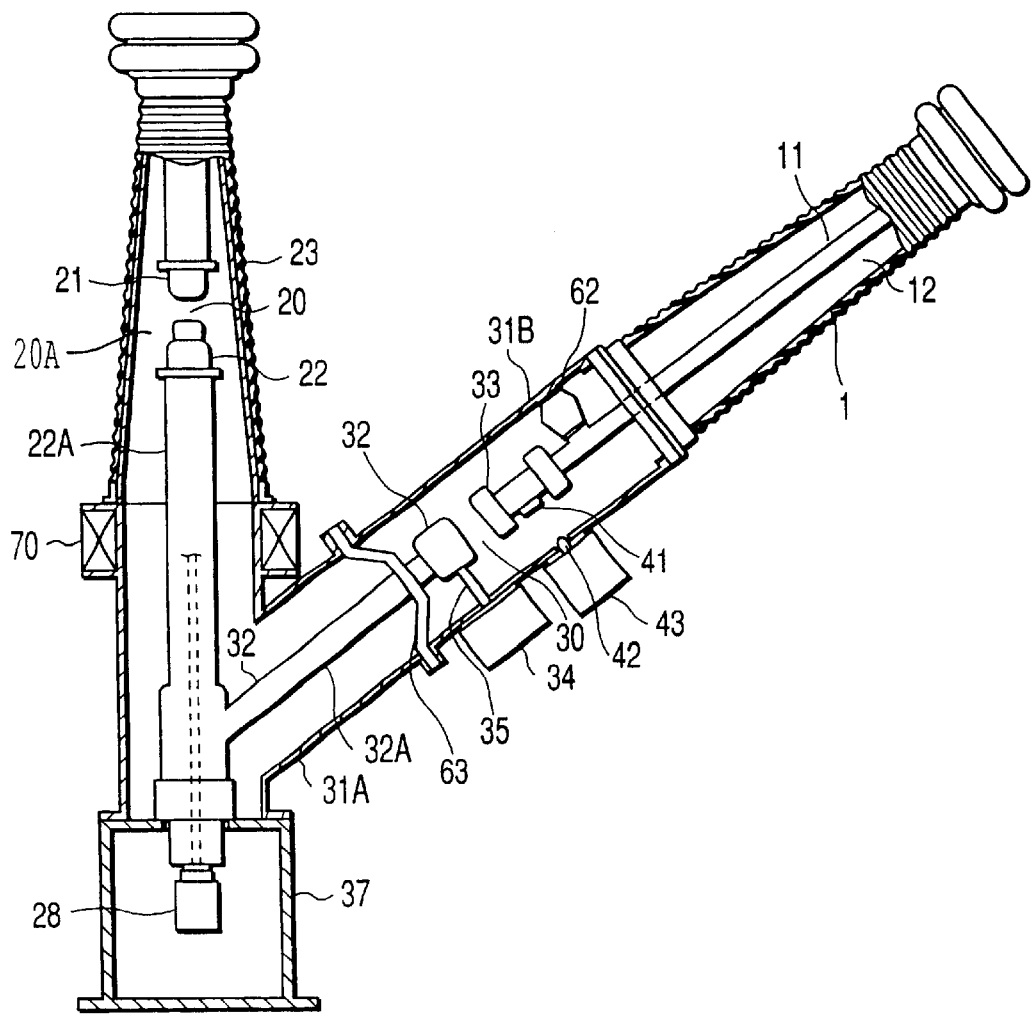
FIG. 13 is a cross sectional view schematically showing the construction of a hybrid type gas insulation switch gear apparatus according to a tenth embodiment of the present invention.

FIG. 13 shows the construction of a hybrid type gas insulation switch gear apparatus according to a tenth embodiment of the present invention. The members of the apparatus common with FIGS. 12 and 13 are denoted by the same reference numerals so as to avoid the overlapping description.

In the tenth embodiment of the present invention, a cylindrical body 31B is joined to the rectangular cylindrical branched portion 31A mounted to the enclosure 31 of the circuit breaker 20, and the bushing 1 is mounted to the cylindrical body 31B, as shown in FIG. 13.

Also, a fixed electrode 31 of the disconnecting switch 30 and the movable electrode 32 capable of movement to contact the fixed electrode 31 are arranged on the same axis. The fixed electrode 31 is supported by and fixed to a substantially columnar insulating member 62 arranged between the conductor portion joined to the conductor 11 of the bushing 1 and the cylindrical branched portion 31A. On the other hand, the movable electrode 32 is supported by the insulating spacer 63 inserted between the open edge of the cylindrical branched portion 31A and the cylindrical body 31B. Also, the hollow conductor 32A supported by the insulating spacer 63 is joined to the hollow conductor 22A connected to the movable electrode 22 of the circuit breaker 20.

In the hybrid type gas insulation switch gear apparatus of the construction described above, it is possible to obtain the function and the effect similar to those obtained in the apparatus according to the first embodiment of the present invention. In addition, since the gas inside the disconnecting switch and the circuit breaker is partitioned by the insulating spacer 63, it is possible to improve the operating efficiency in the inspecting stage.

Figure 14:
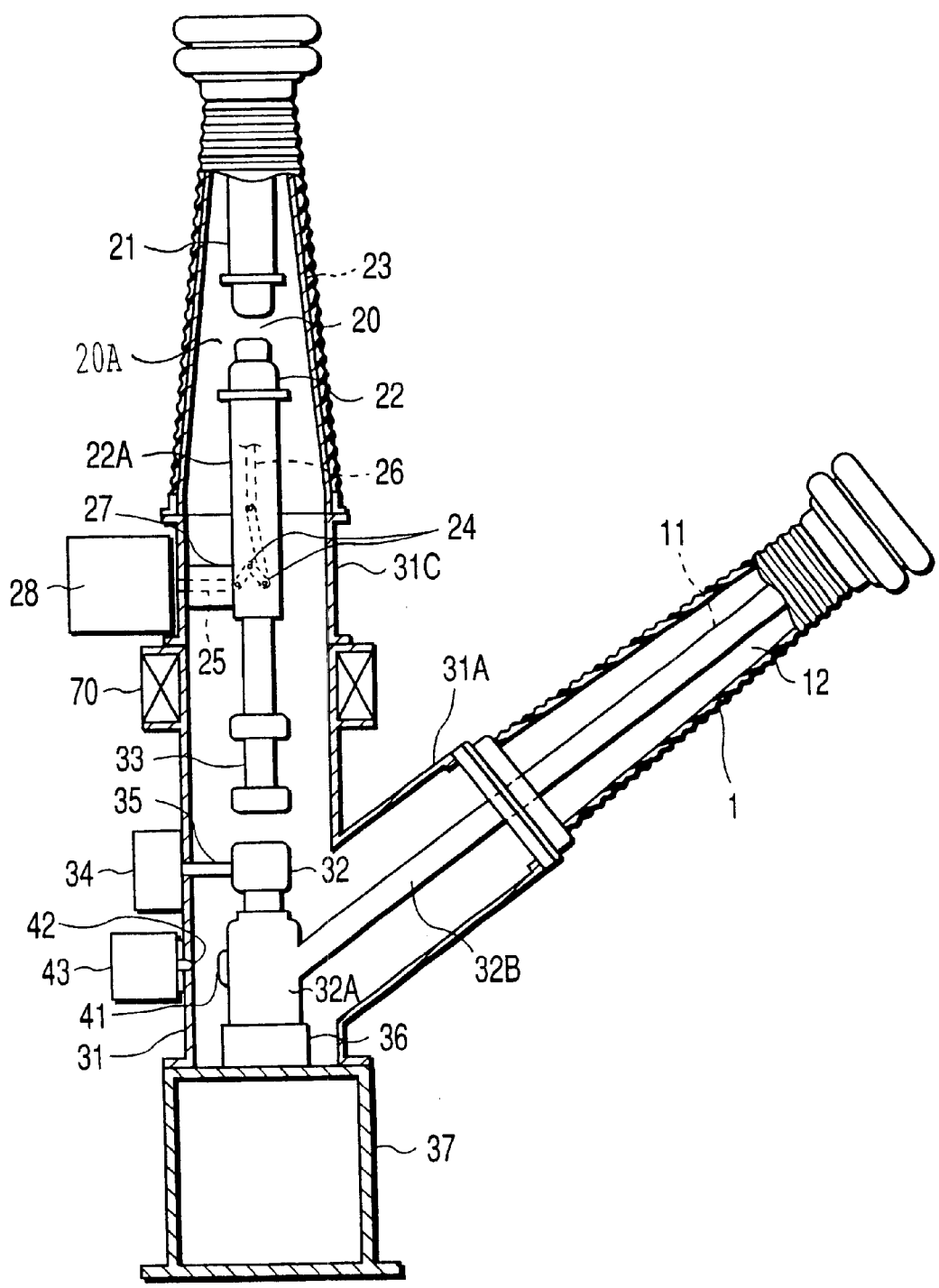
FIG. 14 is a cross sectional view schematically showing the construction of a hybrid type gas insulation switch gear apparatus according to an eleventh embodiment of the present invention.

FIG. 14 shows the construction of a hybrid type gas insulation switch gear apparatus according to an eleventh embodiment of the present invention. The members of the apparatus common with FIGS. 13 and 14 are denoted by the same reference numerals so as to avoid the overlapping description.

A reference numeral 31 shown in FIG. 14 denotes an enclosure of the disconnecting switch 30 to which is mounted a cylindrical branched portion 31A formed by branching obliquely upward a part of the circumferential surface of the cylindrical body. The enclosure 31 is mounted to a supporting frame 37 such that the axis of the enclosure 31 is perpendicular to the installing plane.

The porcelain enclosure 23, which also acts as a bushing, is mounted to the upper open edge of the enclosure 31 via a cylindrical body 31C. Also, the bushing 1 having the conductor 11 arranged within the porcelain enclosure 12 is mounted to the open edge portion of the branched cylindrical portion 31A.

The fixed electrode 33 of the circuit breaker 30 and the movable electrode 32 movable to contact the fixed electrode 33 are arranged on the same axis within the enclosure 31, and the movable electrode 32 is vertically mounted to the supporting frame 37 by the supporting insulating member 36 via the hollow conductor 32A.

The conductor 32B arranged on the axis within the cylindrical branched portion 31A is connected at one end portion to the hollow conductor 32A of the movable electrode 32 and is also connected at the other end portion to the conductor 11 of the bushing 1.

The primary electrode 41 of the earth switch 4 is mounted to a part of the circumferential surface of the hollow conductor 32A of the movable electrode 32, and the earth switch operating mechanism 43 is mounted to the outer circumferential surface of the enclosure 31 facing the primary electrode 41. The earth switch operating mechanism 43 is operated to bring the movable electrode 42 into contact with the primary electrode 41 and to move the movable electrode 42 away from the primary electrode 41.

The operating mechanism 34 is mounted to the outer circumferential surface of the enclosure 31 corresponding to the movable electrode 32. The operating mechanism 34 is operated to bring the movable electrode 32 into contact with the fixed electrode 33 or to move the movable electrode 32 away from the fixed electrode 33 via the operating rod 35.

On the other hand, the fixed electrode 33 of the disconnecting switch 30 is electrically connected to the fixed electrode 21 of the circuit breaker 20 mounted on the same axis within the porcelain enclosure 23 and to the hollow conductor 22A of the movable electrode 22 that is movable to contact the fixed electrode 21 and movable away from the fixed electrode 21. The fixed electrode 21 of the circuit breaker 20 is mounted to the tip portion of the porcelain enclosure 23, and the movable electrode 22 is supported by the inner circumferential surface of the cylindrical body 31C via the insulating member 27.

Also, a circuit breaker operating mechanism 28 is mounted to the outer circumferential surface of the cylindrical body 31C corresponding to the insulating member 27. The operating rod 25 operated by the circuit breaker operating mechanism 28 is joined to the link 26 via the changing lever 24 arranged within the hollow conductor 22A of the movable electrode 22 in a manner to extend through the insulating member 27 so as to bring the movable electrode 22 into contact with the fixed electrode 21 or to permit the movable electrode 22 to be moved away from the fixed electrode 21.

Incidentally, the current transformer 70 is arranged in the vicinity of the upper open edge of the enclosure 31 in a manner to surround the connecting portion between the fixed electrode 33 of the disconnecting switch 30 and the hollow conductor 22A on the side of the movable electrode 22 of the circuit breaker 20.

According to the hybrid type gas insulation switch gear apparatus of the construction described above, the movable electrode 22 of the circuit breaker 20 and the fixed electrode 33 of the disconnecting switch 30 are supported by the insulating member 27 so as to make it possible to arrange substantially linearly the circuit breaker 20 and the disconnecting switch 30. It follows that the entire apparatus can be markedly simplified.

Figure 15:
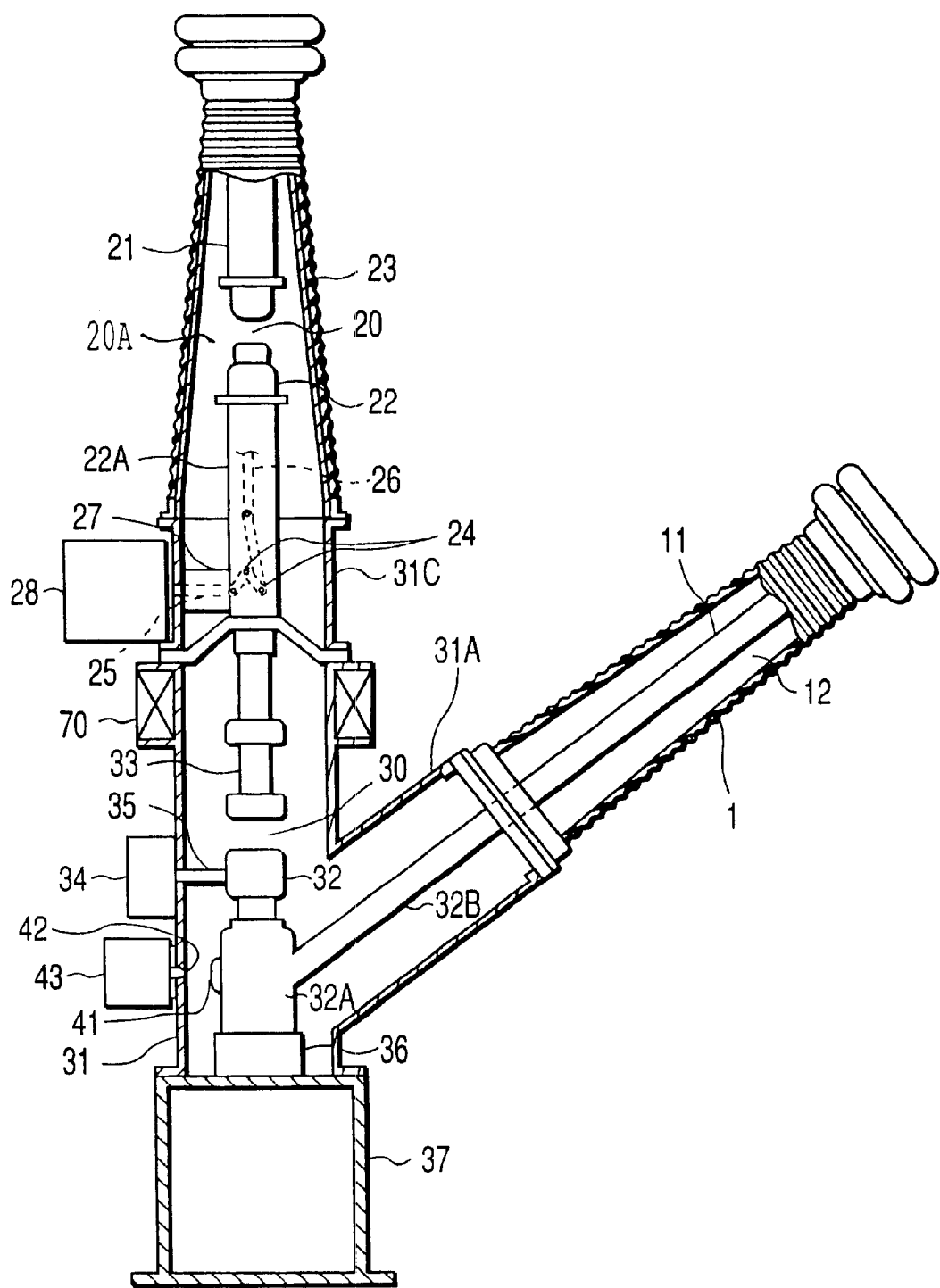
FIG. 15 is a cross sectional view schematically showing the construction of a hybrid type gas insulation switch gear apparatus according to a twelfth embodiment of the present invention.

FIG. 15 shows the construction of a hybrid type gas insulation switch gear apparatus according to a twelfth embodiment of the present invention. The members of the apparatus common with FIGS. 14 and 15 are denoted by the same reference numerals so as to avoid the overlapping description.

In the twelfth embodiment shown in FIG. 15, an insulating spacer 64, which also serves to support the conductor, is arranged between the upper open edge portion of the enclosure 31 and the coupling portion of the cylindrical body 31C.

In the hybrid type gas insulating switch gear apparatus of the construction described above, the gas inside the disconnecting switch 30 and the circuit breaker 30 is partitioned by the insulating spacer 64 so as to improve the operating efficiency in the inspecting stage.

FIG. 16 shows the construction of a hybrid type gas insulation switch gear apparatus according to thirteenth eleventh embodiment of the present invention. The members of the apparatus common with FIGS. 14 and 16 are denoted by the same reference numerals so as to avoid the overlapping description.

In the apparatus according to the thirteenth embodiment of the present invention, a primary electrode 81 of the earth switch 8 is mounted to a part of the circumferential surface of the fixed electrode 33 of the disconnecting switch 30, as shown in FIG. 16. Also, an earth switch operating mechanism 82 is mounted to the outer circumferential surface of the enclosure 31 facing the primary electrode 81. The earth switch operating mechanism 82 is operated to permit the movable electrode 83 to be brought into contact with and to be moved away from the primary electrode 81.

According to the hybrid type gas insulation switch gear apparatus of the construction described above, a second earth switch 8 is arranged between the circuit breaker 20 and the disconnecting switch 30. It follows that the potential in the particular portion can be lowered easily to the ground potential in the inspecting stage so as to improve the safety in the inspecting operation.

Figure 17:
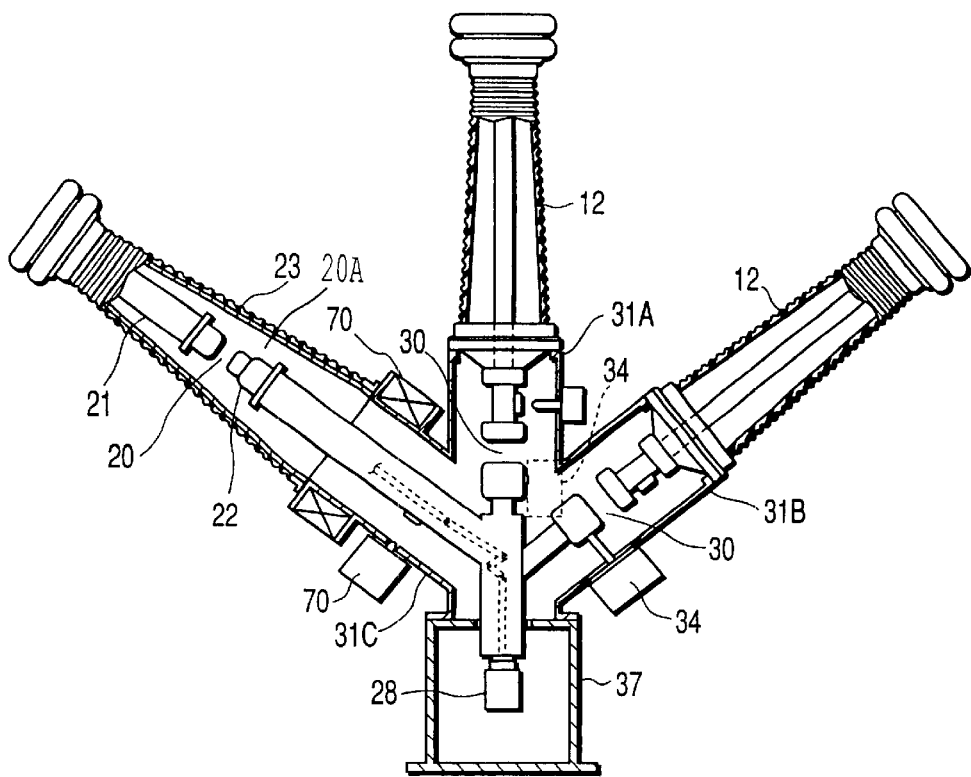
FIG. 17 is a cross sectional view schematically showing the construction of a hybrid type gas insulation switch gear apparatus according to a fourteenth embodiment of the present invention.

FIG. 17 shows the construction of a hybrid type gas insulation switch gear apparatus according to a fourteenth embodiment of the present invention. The members of the apparatus common with FIGS. 3 and 17 are denoted by the same reference numerals so as to avoid the overlapping description.

In the fourteenth embodiment of the present invention, two-way branched cylindrical branched portions 31A and 31B are mounted to the enclosure 31. The fourteenth embodiment is equal to the first embodiment in the constructions of the enclosure 31 and the cylindrical branched portion 31A so as to arrange the disconnecting switch 30 and the circuit breaker 20, and a disconnecting switch 30A having substantially same construction as that of the disconnecting switch 30 on the side of the cylindrical branched portion 31A is provided on the cylindrical branched portion 31B.

Figure 18:
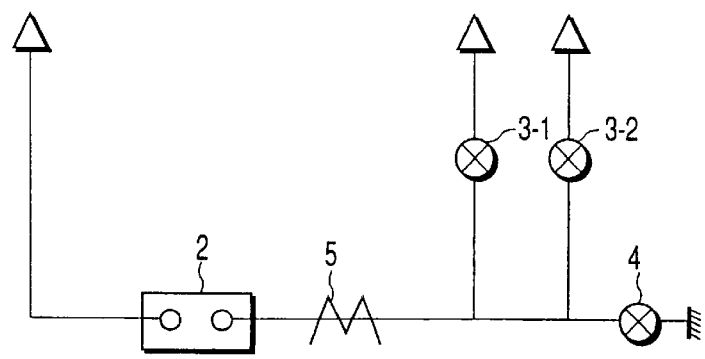
FIG. 18 is a circuit diagram schematically showing the circuit of the hybrid type gas insulation switch gear apparatus shown in FIG. 17.

FIG. 18 is a circuit diagram showing the hybrid type gas insulation switch gear apparatus shown in FIG. 17.

According to the hybrid type gas insulation switch gear apparatus of the particular construction, the two disconnecting switches 30 and 30A can be connected to each other, making it possible to use effectively the apparatus as the hybrid type gas insulation switch gear apparatus of a complex bus type used in a substation.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hybrid type gas insulation switch gear apparatus, comprising:
   a main enclosure including a first cylindrical section having a base and a second cylindrical section branched from the base of the first cylindrical section and obliquely extending from the first cylindrical section, the first and second cylindrical sections having first and second opening sections;
   an insulating bushing mounted to the first opening section and including a hollow insulating housing and a conductor extended in the hollow insulating housing;
   an insulating enclosure mounted to the second opening section and communicated with the second cylindrical section, an insulating gas being sealed in the main enclosure, the insulating bushing and the insulating enclosure;
   a first fixed electrode electrically connected to the conductor and a first movable electrode which are received in the first cylindrical section to form a disconnecting switch;
   an insulating member configured to support the first fixed electrode on the first cylindrical section;
   a connecting conductor electrically connected to the first movable electrode of the disconnecting switch, arranged in the first cylindrical section, and including a branched conductor extending in the second cylinder;
   a main electrode provided in the insulating enclosure;
   a second movable electrode provided in the insulating enclosure and configured to be moved to the main electrode and electrically connected to the main electrode and the branched conductor to form a circuit breaker connected to the disconnecting switch in series;
   a current transformer arranged around the second cylindrical section to detect a current flowing through the connecting conductor; and
   a first earth switch mounted to the first cylindrical section and including a movable counter electrode configured to connect and disconnect the fixed electrode of the disconnecting switch to the ground.

2. The hybrid type gas insulation switch gear apparatus according to claim 1, further comprising a second earth switch mounted on the second cylindrical section and including a movable electrode configured to connect and disconnect the connecting conductor to the ground.

3. The hybrid type gas insulation switch gear apparatus according to claim 1, further comprising a voltage transformer configured to detect a voltage on the first fixed electrode, which is arranged on the first cylindrical section.

4. The hybrid type gas insulation switch gear apparatus according to claim 3, wherein the voltage transformer is a light transforming voltage divider.

5. The hybrid type gas insulation switch gear apparatus according to claims 1, wherein the insulating member is formed of a substantially columnar insulating member.

6. The hybrid type gas insulation switch gear apparatus according to claims 1, wherein one of the insulating bushing and the insulating enclosure is made of porcelain.

7. The hybrid type gas insulation switch gear apparatus according to claim 1, further comprising a second insulating member configured to support the first fixed electrode, which is fixed to the first cylindrical section.

8. The hybrid type gas insulation switch gear apparatus according to claims 1, wherein one of the insulating bushing and the insulating enclosure is made one of FRP and rubber.

9. A hybrid type gas insulation switch gear apparatus, comprising:
   a main enclosure including a first cylindrical section having a base and a second cylindrical section branched from the base of the first cylindrical section and obliquely extending from the first cylindrical section, the first and second cylindrical sections having first and second opening sections;
   an insulating bushing mounted to the second opening section and including a hollow insulating housing and a conductor extended in the hollow insulating housing;
   an insulating enclosure mounted to the first opening section and communicated with the second cylindrical section, an insulating gas being sealed in the main enclosure, the insulating bushing and the insulating enclosure;
   a first fixed electrode and a first movable electrode which are received in the first cylindrical section to form a disconnecting switch;
   a first connecting conductor electrically connected to the first movable electrode of the disconnecting switch, arranged in the first cylindrical section, and including a branched conductor extending in the second cylindrical section electrically connected to the conductor;
   a first insulating member configured to support the branched conductor and the conductor on the second cylindrical section;
   a main electrode provided in the insulating enclosure;
   a second movable electrode provided in the insulating enclosure and configured to be moved to the main electrode and electrically connected to the main electrode to form a circuit breaker;
   a second connecting conductor connected to the second movable electrode of the circuit breaker and the fixed electrode of the disconnecting switch, the circuit breaker, the second connecting conductor and the disconnecting switch being arranged substantially in line;

a current transformer arranged around the first cylindrical section to detect a current flowing through the second connecting conductor; and an earth switch mounted to the first cylindrical section and including a movable counter electrode configured to connect and disconnected the fixed electrode of the disconnecting switch to the ground.

10. The hybrid type gas insulation switch gear apparatus according to claim 9, further comprising an insulating spacer arranged between said disconnecting switch and said circuit breaker, configured to partition the insulating enclosure from the first cylindrical section.

11. The hybrid type gas insulation switch gear apparatus according to claim 9, further comprising a second earth switch mounted on the first cylindrical section and including a second counter movable electrode configured to connect and disconnected the second connecting conductor to the ground.

12. The hybrid type gas insulation switch gear apparatus according to claim 9, further comprising a voltage transformer configured to detect a voltage on the first fixed electrode, which is arranged on the first cylindrical section.

13. The hybrid type gas insulation switch gear apparatus according to claim 12, wherein a voltage transformer is a light transforming voltage divider.

14. The hybrid type gas insulation switch gear apparatus according to claim 9, wherein the insulating member is formed of a substantially columnar insulating member.

15. The hybrid type gas insulation switch gear apparatus according to claim 9, wherein one of the insulating bushing and the insulating enclosure is made of porcelain.

16. The hybrid type gas insulation switch gear apparatus according to claim 9, further comprising second insulating member configured to support the first fixed electrode, which is fixed to the first cylindrical section.

17. The hybrid type gas insulation switch gear apparatus according to claims 1, wherein one of the insulating bushing and the insulating enclosure is made one of FRP and rubber.

18. A hybrid type gas insulation switch gear apparatus, comprising:

a main enclosure including a first cylindrical section having a base and second and third cylindrical sections branched from the base of the first cylindrical section and obliquely extending from the first cylindrical section, the first, second and third cylindrical sections having first, second and third opening sections;

first and second insulating bushings mounted to the first and second opening sections, each including a hollow insulating housing and a conductor extended in the hollow insulating housing;

an insulating enclosure mounted to the third opening section and communicated with the second cylindrical section, an insulating gas being sealed in the main enclosure, the first and second insulating bushings, and the insulating enclosure;

first and second fixed electrodes electrically connected to the corresponding conductor of the bushings and first and second movable electrodes, the first fixed and movable electrodes being received in the first cylindrical section to form a first disconnecting switch and second fixed and movable electrodes being received in the second cylindrical section to form a second disconnecting switch;

first and second insulating members configured to support the first and second fixed electrodes on the first and second cylindrical sections;

a connecting conductor including a base conductor section and first and second branched conductor sections extending from the base conductor section in the second and third cylinder sections, the base and second conductor sections being electrically connected to the first and second movable electrodes of the first and second disconnecting switches; and a main electrode provided on the insulating enclosure;

a third movable electrode provided in the insulating enclosure and configured to be moved to the main electrode and electrically connected to the main electrode and the first branched conductor to form a circuit breaker, the circuit breaker being connected to the first and second disconnecting switches in series;

a current transformer arranged around the second cylindrical section to detect a current flowing through the connecting conductor; and an earth switch mounted to the first cylindrical section and including a movable counter electrode configured to connect and disconnected the fixed electrode of the disconnecting switch to the ground.

19. The hybrid type gas insulation switch gear apparatus according to claim 18, wherein the first and second insulating members are formed of a substantially columnar insulating member.

20. The hybrid type gas insulation switch gear apparatus according to claim 18, further comprising a voltage transformer configured to detect a voltage on the first fixed electrode, which is arranged in the first cylindrical section.

21. The hybrid type gas insulation switch gear apparatus according to claim 20, wherein the voltage transformer is a light conversion type current transformer.

22. The hybrid type gas insulation switch gear apparatus according to claim 18, wherein one of the insulating bushings and insulating enclosure is made one of FRP and rubber.

23. A hybrid type gas insulation switch gear apparatus, comprising:

a main enclosure including a first cylindrical section having a base and a second cylindrical section branched from the base of the first cylindrical section and obliquely extending from the first cylindrical section, the first and second cylindrical sections having first and second opening sections;

an insulating bushing mounted to the second opening section and including a hollow insulating housing and a conductor extended in the hollow insulating housing;

an insulating enclosure mounted to the first opening section and communicated with the first cylindrical section, an insulating gas being sealed in the main enclosure, the insulating bushing and the insulating enclosure;

a fixed electrode electrically connected to the conductor and a movable electrode which are received in the second cylindrical section to form a disconnecting switch;

an insulating member configured to support the first fixed electrode of the disconnecting switch on the second cylindrical section;

a connecting conductor arranged in the first cylindrical section, and including a branched conductor extending in the second cylinder and connected to the first movable switch of the disconnecting switch;

a main electrode provided on the insulating enclosure;

a movable electrode provided in the insulating enclosure and configured to be moved to the main electrode and electrically connected to the main electrode and the branched conductor to form a circuit breaker, the circuit breaker being connected to the disconnecting switch in series;

a current transformer arranged around the first cylindrical section to detect a current flowing through the connecting conductor; and an earth switch mounted to the second cylindrical section and including a movable counter electrode configured to connect and disconnected the fixed electrode of the disconnecting switch to the ground.

24. The hybrid type gas insulation switch gear apparatus according to claim 23, wherein the insulating member is formed of a substantially columnar insulating member.

25. The hybrid type gas insulation switch gear apparatus according to claim 23, wherein one of the insulating bushing and the insulating enclosure is made of porcelain.

26. The hybrid type gas insulation switch gear apparatus according to claim 23, further comprising a second insulating member configured to support the first fixed electrode, which is fixed to the second cylindrical section.

27. The hybrid type gas insulation switch gear apparatus according to claim 23, wherein one of the insulating bushing and the insulating enclosure is made one of FRP and rubber.

* * * * *